June 7, 1960 J. FRASER ET AL 2,939,487
FLOW CONTROL DEVICE
Filed Aug. 21, 1957

INVENTORS
JAMES FRASER
& EDWARD S. MC LEAN

BY *Holcombe, Wetherill & Brisebois*
ATTORNEYS

United States Patent Office 2,939,487
Patented June 7, 1960

2,939,487
FLOW CONTROL DEVICE

James Fraser and Edward S. McLean, Wilmington, Del., assignors to Speakman Company, Wilmington, Del.

Filed Aug. 21, 1957, Ser. No. 679,508

3 Claims. (Cl. 138—45)

This invention relates to a fluid control device and more particularly to a device for maintaining a substantially constant rate of fluid flow irrespective of wide variations in fluid pressure.

Many devices for controlling the flow of fluid, use deformable members. These usually have a central opening which is partially closed when the pressure is increased. These devices all have a common failure of creating a noise due to the water discharging through a restricted orifice, which orifice becomes smaller as the pressure increases.

It is an object of the present invention to provide a novel means for controlling the volume of fluid delivery in a fluid system regardless of the pressure in the system.

It is still another object of this invention to provide an elastic member having a series of orifices thereunder, at least some of these orifices being restricted under pressure.

It is a still further object of this invention to have a plurality of orifices, the stream of liquid flowing through each orifice impinging one upon the other.

It is still another object of this invention to provide a device that will give control of the volume delivered in a fluid conduit over certain specific pressure ranges.

The various features of novelty which characterise this invention are pointed out with particularity in the claims annexed hereto and forming part of this specification. For a better understanding of the invention, its advantages and specific objects obtained by its use, reference should be had to the accompanying drawings and descriptive matter in which is illustrated and described the preferred embodiment of the invention.

Figure 1:
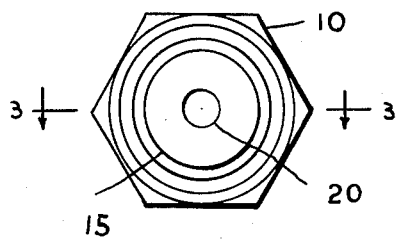
Fig. 1 is a plan view of the conduit and the volume control device.

Referring to the drawings, 10 indicates a casing, having a passageway therethrough and having the male threaded portion 11 at the lower end thereof and the female threaded portion 12 at the upper end thereof. This casing has a shoulder 13 near the lower end of the casing and the lower shoulder 14 therebelow. The flow control device 15 rests within this casing on the shoulder 13 and has an interlocking part 16 that comes below the shoulder 14. This locks this device into position within the casing and permits the device to operate in the position shown in Fig. 3, or in an inverted position. The body portion 17 of this device has a top portion 18 attached thereto by means of the connecting members 19. This is all molded in one piece from a deformable material such as rubber, synthetic rubber, neoprene, etc.

Figure 3:
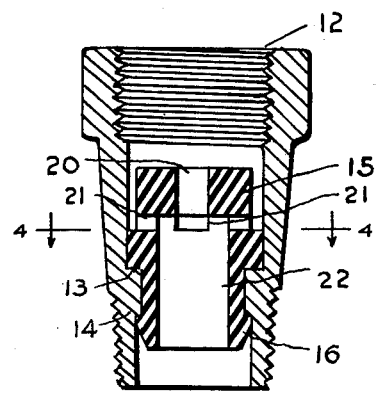
Fig. 3 is a sectional view on line III—III of Fig. 1.
Figure 2:
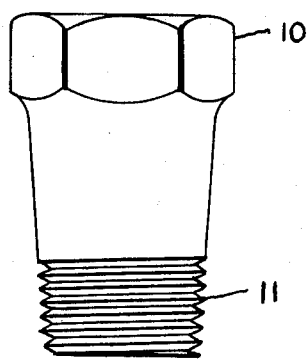
Fig. 2 is a side view of the conduit.
Figure 5:
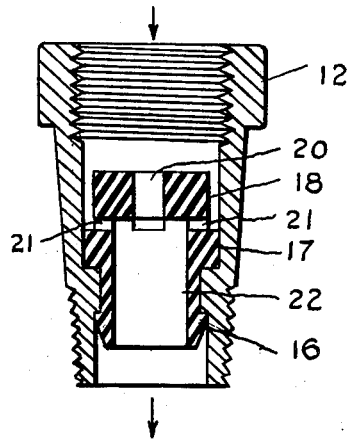
Fig. 5 is a sectional view, similar to Fig. 3, showing the device under pressure.
Figure 4:
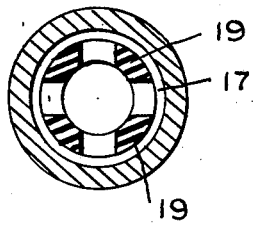
Fig. 4 is a sectional view on line IV—IV of Fig. 3.

The fluid under pressure is admitted through the opening at the top, shown in Figs. 1, 3 and 5 and flows through the central opening 20 as well as the side passages 21, 21 thereunder, and out through the passageway 22 in the body portion. As the fluid flow is increased the pressure on the upper surface of the top portion 18 forces this part downwardly and compresses the connecting members 19, 19, shown in Fig. 4. This substantially reduces the area of the openings 21, 21 and in turn reduces the flow of the fluid through the device. The fluid flowing through the passages 21, 21, impinges with the fluid flowing through the center aperture 20 and prevents the characteristic noise made by devices of this type. The upper portion 18 does not compress substantially under quite wide variations in pressure, because of its heavy construction. When the pressure is increased to the point where the side openings 21, 21 are substantially closed, the fluid can still flow through central openings 20. This allows quite active control of the fluid delivered within the pressure range from a very low pressure to that which will substantially close the side passages 21, 21. This is the usual pressure range found in domestic water systems and allows accurate control of the delivery volume regardless of the pressure within this range. This same type of device has many other uses besides controlling water pressure and it is not intended to limit this application to such a use.

While in accordance with the provisions of the statute there has been illustrated and described the best forms of embodiment of this invention now known, it will be apparent to those skilled in the art that changes may be made in the form of the apparatus disclosed, without departing from the spirit of this invention as set forth in the appended claims, and in some cases certain features of this invention may be used to advantage without a corresponding use of other features.

What is claimed is:

1. A fluid control device for maintaining a substantially uniform fluid delivery rate, comprising a casing having a passageway extending therethrough, a shoulder in said passageway, and an elastic member extending into substantial engagement with the side walls thereof, said elastic member comprising a top portion spaced from the sides of said passageway, and a body portion having a part thereof resting on said shoulder, and a part thereof below said shoulder, and thereby embracing said shoulder, said body portion having a passageway extending therethrough, said passageway in said body portion being in open communication with said passageway in said casing, said top portion being attached to said body portion by means of upright supports having fluid passages between said supports, said fluid passages communicating with said passageway in said body portion and with said passageway in said casing, said top portion remaining substantially rigid during use.

2. A device as claimed in claim 1, wherein the top portion has a center aperture therein, communicating with the passageway in said body portion.

3. A device as claimed in claim 1, wherein said elastic member is made of rubber.

References Cited in the file of this patent

UNITED STATES PATENTS 2,815,041    Rimsha et al. _____ Dec. 3, 1957